(12) United States Patent
Hoffart

(10) Patent No.: US 6,907,941 B1
(45) Date of Patent: Jun. 21, 2005

(54) SLIDING QUICK ATTACH SYSTEM

(76) Inventor: Ronald J. Hoffart, 755 2nd Ave. NW., West Fargo, ND (US) 58078

(*) Notice: Subject to any disclaimer, the term of this patent is extended or adjusted under 35 U.S.C. 154(b) by 20 days.

(21) Appl. No.: 10/622,959

(22) Filed: Jul. 18, 2003

(51) Int. Cl.$^7$ ............................ A01B 51/00; F16B 2/18
(52) U.S. Cl. .................................... 172/272; 403/325
(58) Field of Search ..................... 172/272, 439–441, 172/810–834; 37/468, 906, 231; 414/723, 414/703, 920; 403/325, 326, 327, 24–27, 403/49; 280/416.2, 416.1

(56) References Cited

U.S. PATENT DOCUMENTS

| | | | |
|---|---|---|---|
| 2,059,431 A | 11/1936 | Barrett et al. ................ | 37/144 |
| 2,749,631 A | 6/1956 | Thompson .................... | 37/156 |
| 2,792,650 A | 5/1957 | Kenyon ......................... | 37/42 |
| 3,539,022 A | 11/1970 | Berg ............................. | 172/805 |
| 3,631,930 A | 1/1972 | Peterson ....................... | 172/804 |
| 3,674,096 A | 7/1972 | Berg ............................. | 172/805 |
| 3,690,386 A | 9/1972 | Magee .......................... | 172/804 |
| 3,698,490 A | 10/1972 | King ............................. | 172/803 |
| 3,759,110 A | 9/1973 | Davis ............................ | 74/99 |
| 3,913,684 A | 10/1975 | Casey et al. ................. | 172/804 |
| 3,941,195 A | 3/1976 | Stedman ....................... | 172/801 |
| 4,019,588 A | 4/1977 | Casey ........................... | 172/804 |
| 4,221,267 A | 9/1980 | Asal et al. .................... | 172/804 |
| 4,221,282 A | 9/1980 | Wampfler ..................... | 191/68 |
| 4,241,794 A | 12/1980 | Halterman, Jr. .............. | 172/804 |
| 4,248,311 A | 2/1981 | Frisbee et al. ............... | 172/819 |
| 4,270,617 A | 6/1981 | Cantarella et al. ........... | 172/821 |
| 4,337,837 A | 7/1982 | Nissen .......................... | 172/822 |
| 4,364,439 A | 12/1982 | Asal ............................. | 172/821 |
| 4,369,590 A | 1/1983 | Miller ........................... | 37/231 |
| 4,405,019 A | 9/1983 | Frisbee ......................... | 172/816 |
| RE31,642 E | 8/1984 | Asal et al. .................... | 172/821 |
| 4,463,507 A | 8/1984 | Gaub ............................. | 37/117.5 |
| 4,828,044 A | 5/1989 | Horsch et al. ................ | 172/821 |
| 4,893,683 A | 1/1990 | Horsch et al. ................ | 172/821 |
| 4,962,598 A | 10/1990 | Woolhiser et al. ........... | 37/231 |
| 4,976,054 A | 12/1990 | Jones ............................ | 37/235 |
| 5,010,961 A | 4/1991 | Frisbee ......................... | 172/821 |
| 5,263,810 A * | 11/1993 | Takekata et al. ............. | 414/723 |
| 5,419,673 A * | 5/1995 | Merhar .......................... | 414/723 |
| 5,447,204 A | 9/1995 | Asal et al. .................... | 172/821 |
| 5,634,523 A | 6/1997 | Kobayashi et al. .......... | 172/818 |
| 5,692,855 A * | 12/1997 | Burton .......................... | 403/325 |
| 6,041,870 A | 3/2000 | Zimmerman et al. ........ | 172/811 |

(Continued)

OTHER PUBLICATIONS

Bobcat.com, Jul. 17, 2003, Bobcat company.
Pictures of Unknown Brand of Belly Blade, Taken 2003.

Primary Examiner—Robert E Pezzuto
(74) Attorney, Agent, or Firm—Michael S. Neustel

(57) ABSTRACT

A sliding quick attach system for allowing sliding movement of the implement while providing quick attachment and release of the implement. The sliding quick attach system includes a support frame, a first brace and a second brace extending upwardly from the support frame, a catch member attached to the upper ends of the braces, a first latch structure and a second latch structure attached near opposing ends of the support frame, and an implement unit having an upper lip and a lower lip with at least one slot. The locking pin of the latch structure slidably extends within the slot within the lower lip of the implement unit for retaining the implement unit while allowing side-to-side movement of the implement unit.

20 Claims, 10 Drawing Sheets

U.S. PATENT DOCUMENTS

| | | | |
|---|---|---|---|
| 6,059,048 A | 5/2000 | Subrt | 172/821 |
| 6,105,682 A | 8/2000 | Recker et al. | 172/811 |
| 6,247,540 B1 | 6/2001 | Clemen et al. | 172/818 |
| 6,273,198 B1 | 8/2001 | Bauer et al. | 172/825 |
| 2003/0140529 A1 | 7/2003 | Bloxdorft et al. | 37/266 |
| 2003/0217852 A1 | 11/2003 | Bernhardt et al. | 172/200 |

* cited by examiner

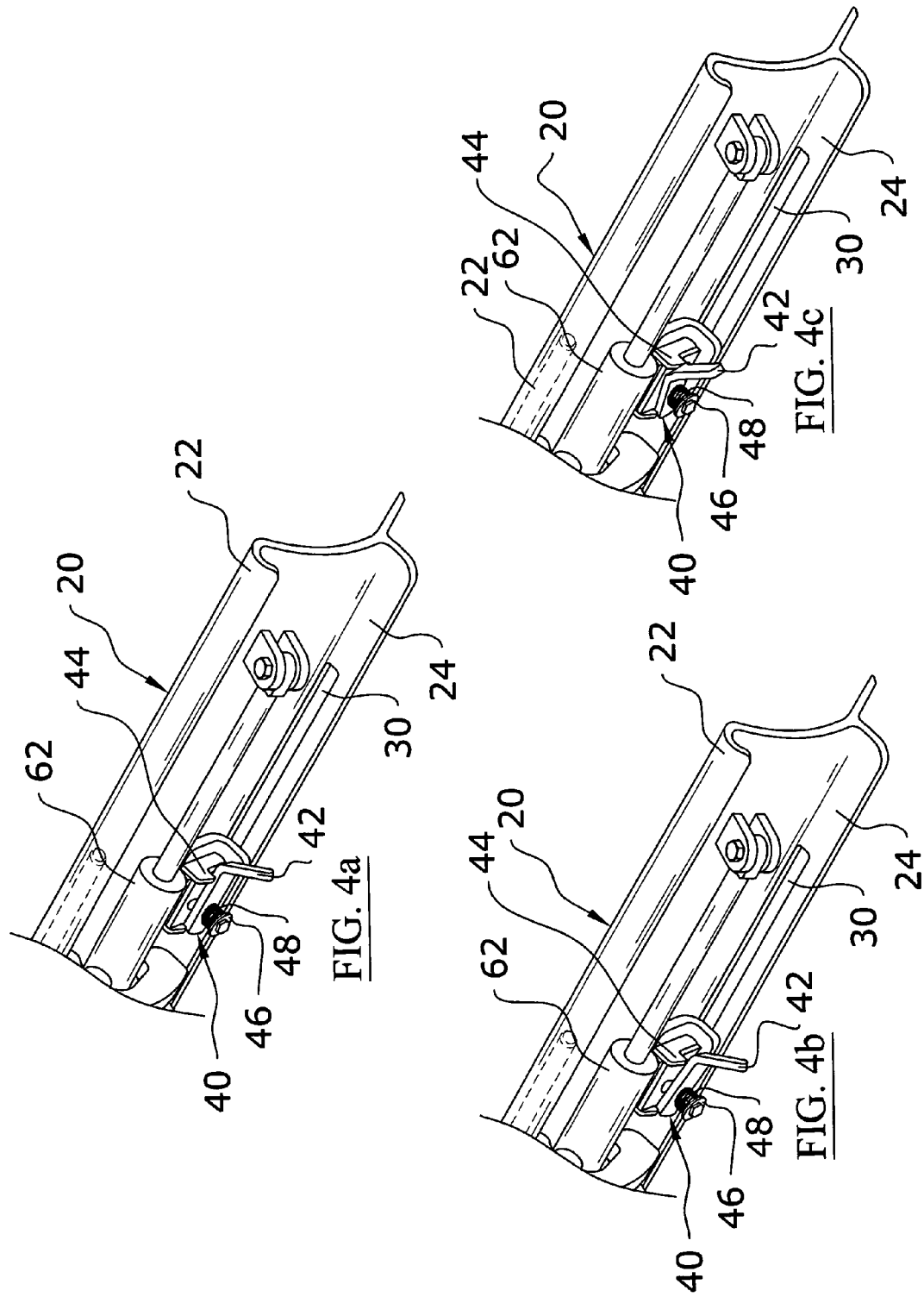

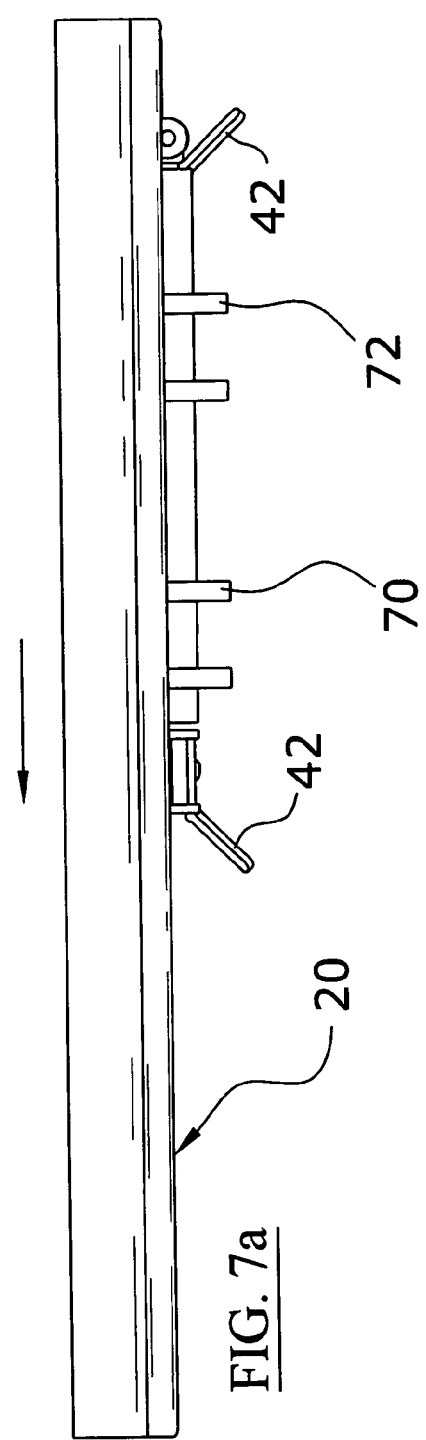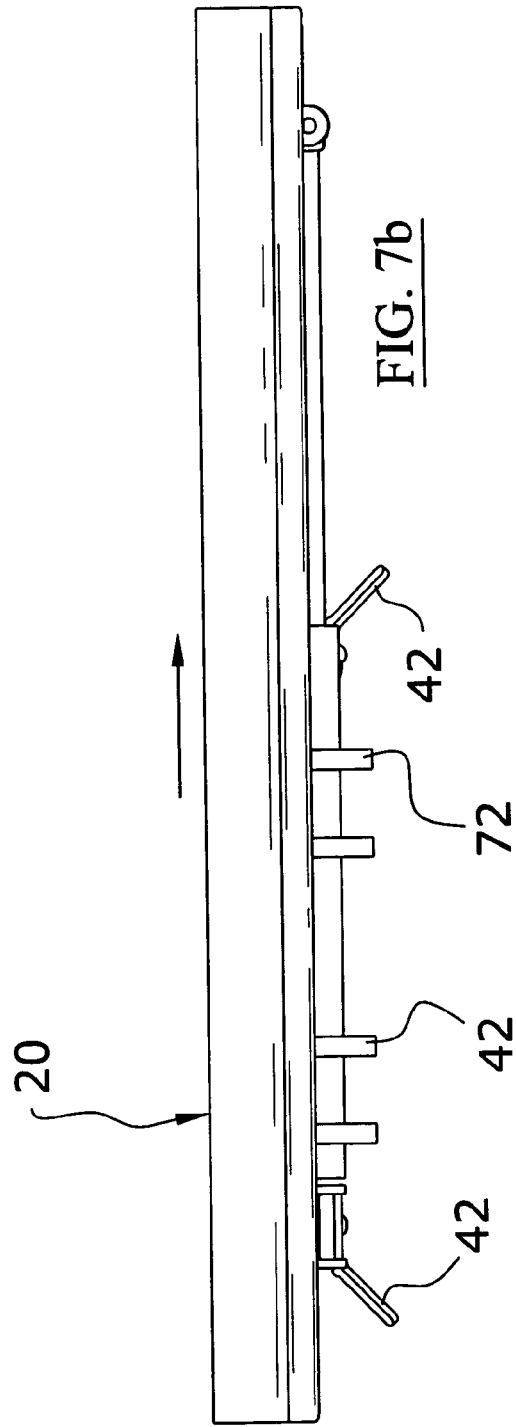

SLIDING QUICK ATTACH SYSTEM

CROSS REFERENCE TO RELATED APPLICATIONS

Two other utility patent applications are being filed with the USPTO simultaneously with this application identified by Ser. Nos. 10/622,961 and 10/622,964.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to implement attachment devices and more specifically it relates to a sliding quick attach system for allowing sliding movement of the implement while providing quick attachment and release of the implement.

2. Description of the Related Art

Conventional implement mounting arrangements have been in use for years for mounting various types of implements to tractors and like vehicles. Implements mounted to these structures range from loaders, blades, belly blades, rollers, brushes and the like. A typical implement mounting arrangement is the front-end loader commonly utilized upon small to large tractors. Another type of implement mounting arrangement is comprised of a belly structure that is attached beneath the frame of a tractor preferably capable of operating about various axes to provide lift, roll, pitch and yaw to an implement.

A conventional method of attaching implements to the implement mounting structure is by conventional fasteners such as pins and the likes. However, this mounting process is time consuming to attach and disconnection an implement. A solution to this problem has been developed utilizing "quick attach" devices.

A popular quick attach product is produced under the BOBCAT brand by INGERSOLL-RAND called the BOB-TACH SYSTEM (http://www.bobcat.com/products/att/index.jhtml). The BOB-TACH SYSTEM utilizes an upper hook structure that catchably engages an upper flange of the implement and a wedge structure that is extended through an aperture within a lower lip of the implement. The BOB-TACH SYSTEM allows for quick attaching and release of an implement. The main problem with the BOB-TACH SYSTEM is that it does not allow the implement to slide from side-to-side when attached to the loader.

While these devices may be suitable for the particular purpose to which they address, they are not as suitable for allowing sliding movement of the implement while providing quick attachment and release of the implement. Conventional quick attachment structures do not allow for sliding movement of an implement.

In these respects, the sliding quick attach system according to the present invention substantially departs from the conventional concepts and designs of the prior art, and in so doing provides an apparatus primarily developed for the purpose of allowing sliding movement of the implement while providing quick attachment and release of the implement.

BRIEF SUMMARY OF THE INVENTION

In view of the foregoing disadvantages inherent in the known types of quick attach structures now present in the prior art, the present invention provides a new sliding quick attach system construction wherein the same can be utilized for allowing sliding movement of the implement while providing quick attachment and release of the implement.

The general purpose of the present invention, which will be described subsequently in greater detail, is to provide a new sliding quick attach system that has many of the advantages of the quick attach structures mentioned heretofore and many novel features that result in a new sliding quick attach system which is not anticipated, rendered obvious, suggested, or even implied by any of the prior art quick attach structures, either alone or in any combination thereof.

To attain this, the present invention generally comprises a support frame, a first brace and a second brace extending upwardly from the support frame, a catch member attached to the upper ends of the braces, a first latch structure and a second latch structure attached near opposing ends of the support frame, and an implement unit having an upper lip and a lower lip with at least one slot. The locking pin of the latch structure slidably extends within the slot within the lower lip of the implement unit for retaining the implement unit while allowing side-to-side movement of the implement unit.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a sliding quick attach system that will overcome the shortcomings of the prior art devices.

A second object is to provide a sliding quick attach system for allowing sliding movement of the implement while providing quick attachment and release of the implement.

Another object is to provide a sliding quick attach system that may be utilized with various types of implements including but not limited to blades, plows, brushes and the like.

An additional object is to provide a sliding quick attach system that may be utilized with various types of tractors and like vehicles.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 4a is a magnified upper perspective view of the latch structure fully engaged with the implement unit.

FIG. 4b is a magnified upper perspective view of the latch structure with the lever member released from the engaging portion.

FIG. 4c is a magnified upper perspective view of the latch structure with the lever member rotated thereby retracting the locking pin from within the slot of the implement unit.

FIG. 7a is a top view of the present invention with the implement unit being slid to the left.

FIG. 7b is a top view of the present invention with the implement unit being slid to the right.

DETAILED DESCRIPTION OF THE INVENTION

A. Overview

Figure 1:
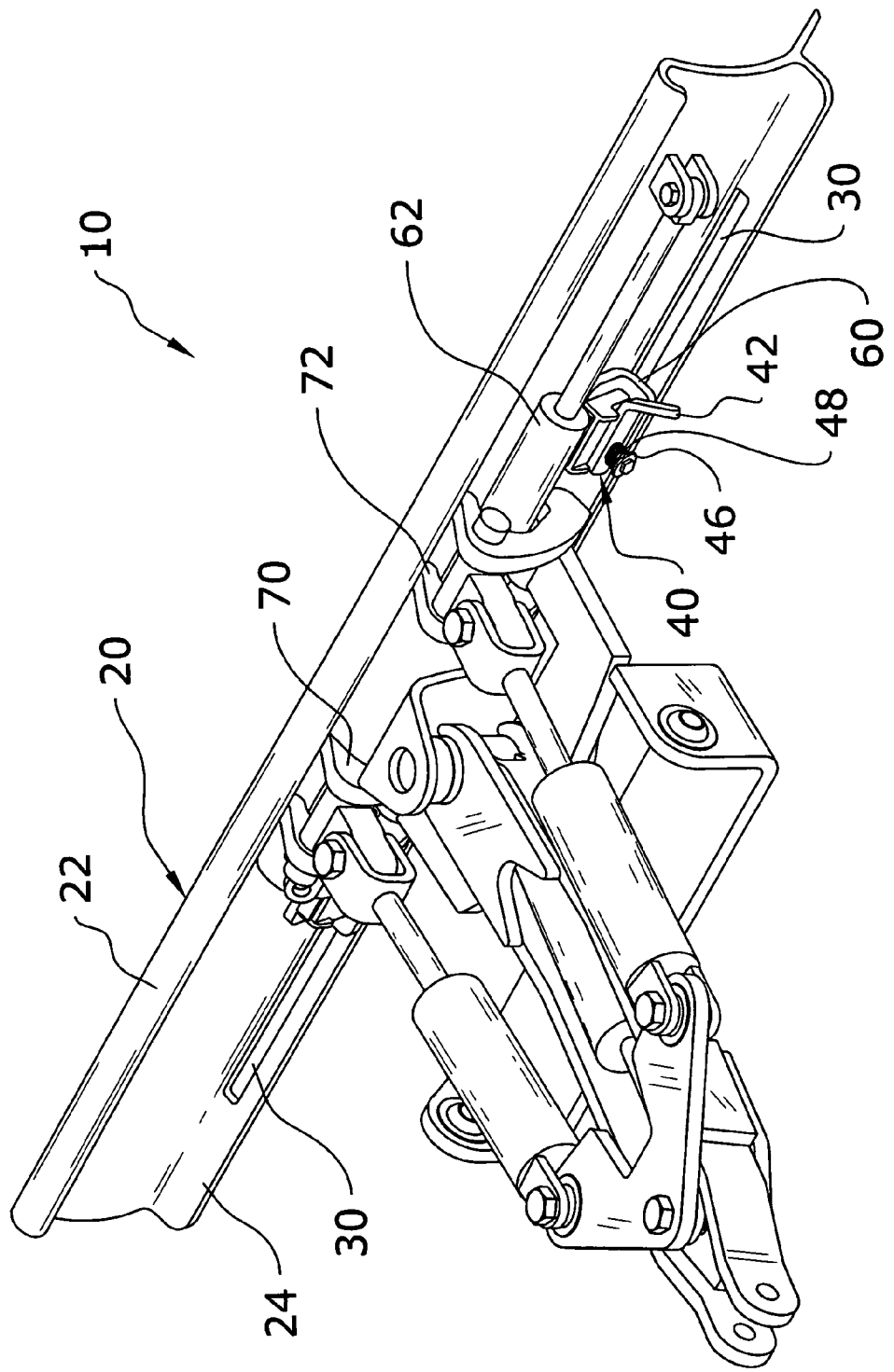
FIG. 1 is a rear upper perspective view of the present invention with a blade implement attached.

Turning now descriptively to the drawings, in which similar reference characters denote similar elements throughout the several views, FIGS. 1 through 7b illustrate a sliding quick attach system 10, which comprises a support frame 60, a first brace 70 and a second brace 72 extending upwardly from the support frame 60, a catch member 74 attached to the upper ends of the braces, a first latch structure 40 and a second latch structure 40 attached near opposing ends of the support frame 60, and an implement unit 20 having an upper lip 22 and a lower lip 24 with at least one slot 30. The locking pin 50 of the latch structure 40 slidably extends within the slot 30 within the lower lip 24 of the implement unit 20 for retaining the implement unit 20 while allowing side-to-side movement of the implement unit 20.

B. Support Frame

Figure 2:
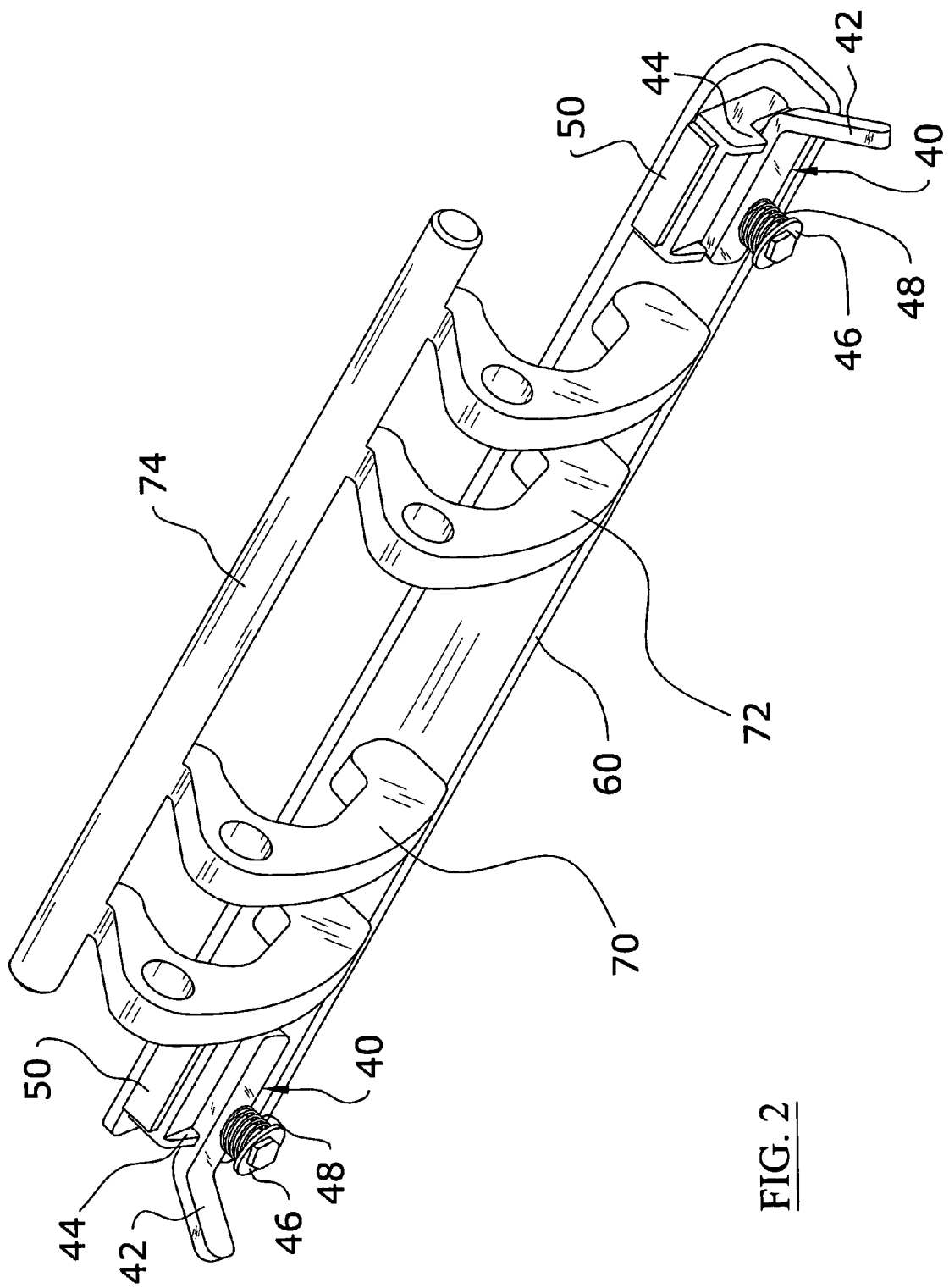
FIG. 2 is a rear upper perspective view of the present invention.

As shown in FIG. 2 of the drawings, the support frame 60 is an elongate structure having a lower edge. The lower edge is formed for slidably receiving an inner portion of the lower lip 24 of the implement unit 20. The lower edge is preferably comprised of a flat and straight structure for allowing sliding movements adjacent thereto by the implement unit 20.

As shown in FIG. 2 of the drawings, a first brace 70 and a second brace 72 extend between the support frame 60 and the catch member 74. The first brace 70 and the second brace 72 preferably have a connecting structure capable of connecting to a support structure such as a front-end loader. It can be appreciated that various other brace structures may be utilized within the present invention.

C. Catch Member

The catch member 74 is preferably comprised of an elongate structure as shown in FIG. 2 of the drawings. The catch member 74 preferably is attached to the support frame 60 substantially parallel to the lower edge as further shown in FIG. 2 of the drawings.

The catch member 74 is preferably comprised of a rod structure as best shown in FIG. 2 of the drawings. The catch member 74 may have various cross sectional shapes, however it is preferable to have a circular cross sectional shape for the catch member 74 as shown in FIG. 2 of the drawings. The catch member 74 preferably has a straight structure for allowing the implement unit 20 to slide upon the catch member 74. It can be appreciated that the catch member 74 may be separated into two or more separate segments.

D. Latch Structure

As shown in FIG. 2 of the drawings, at least one latch structure 40 is attached to the support structure for securing the implement unit 20. As shown in FIG. 2, it is preferable to have two opposing latch structures 40 attached to the support frame 60, however various other numbers and combinations of latch structures 40 may be utilized.

Figure 3:
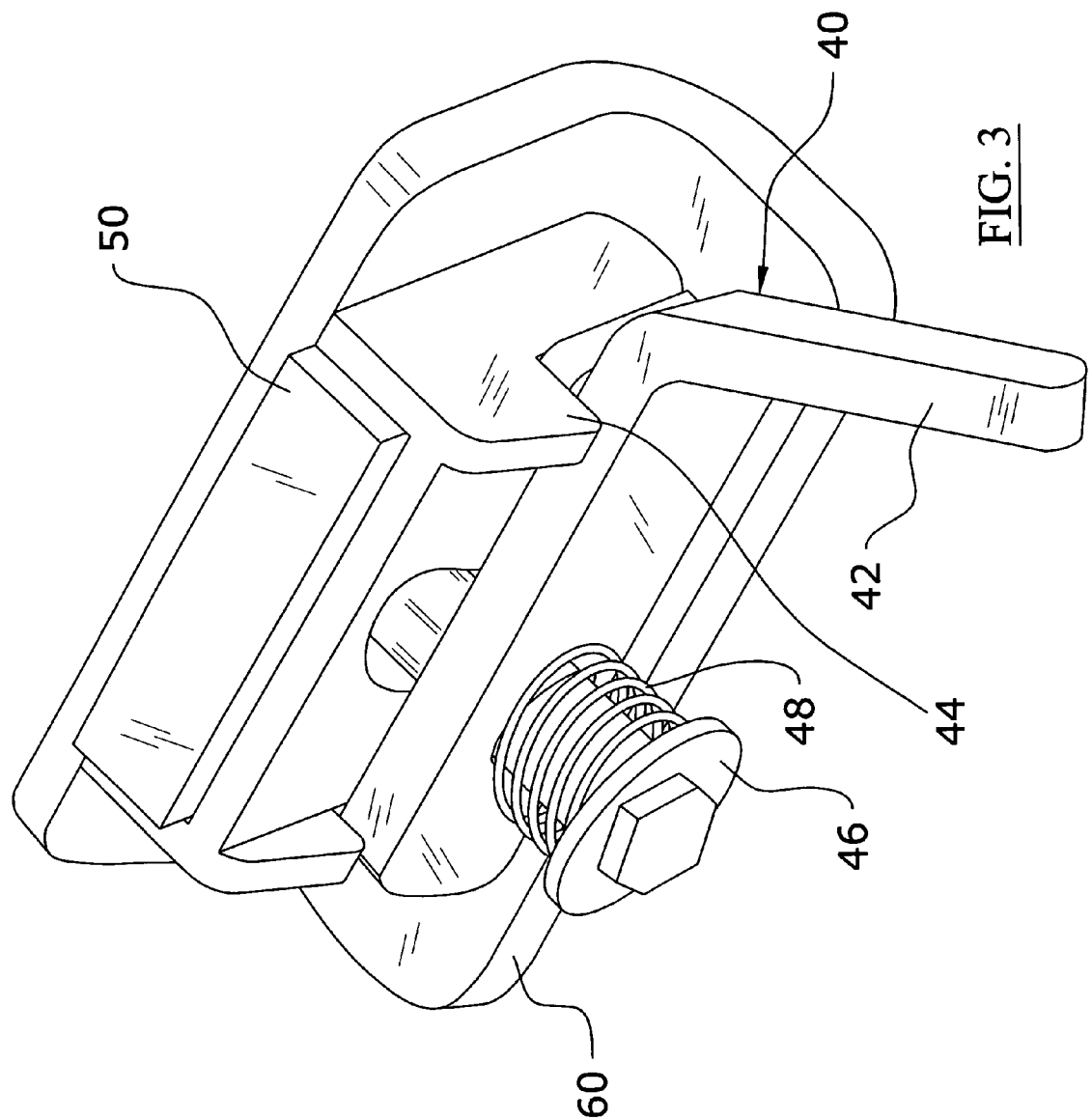
FIG. 3 is a magnified upper perspective view of the latch structure.
Figure 5A:
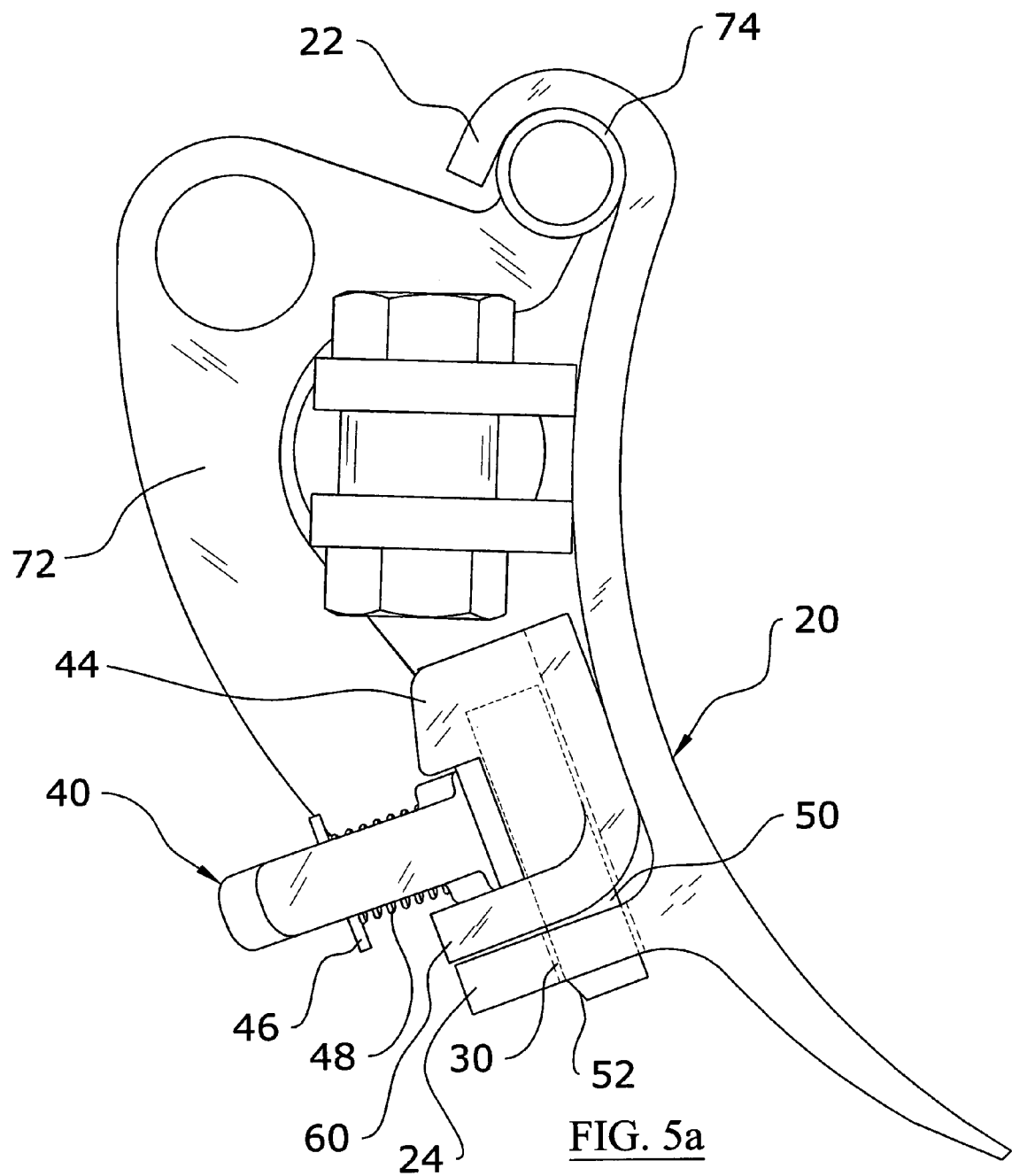
FIG. 5a is a side view of the latch structure fully engaged with the implement unit.
Figure 5B:
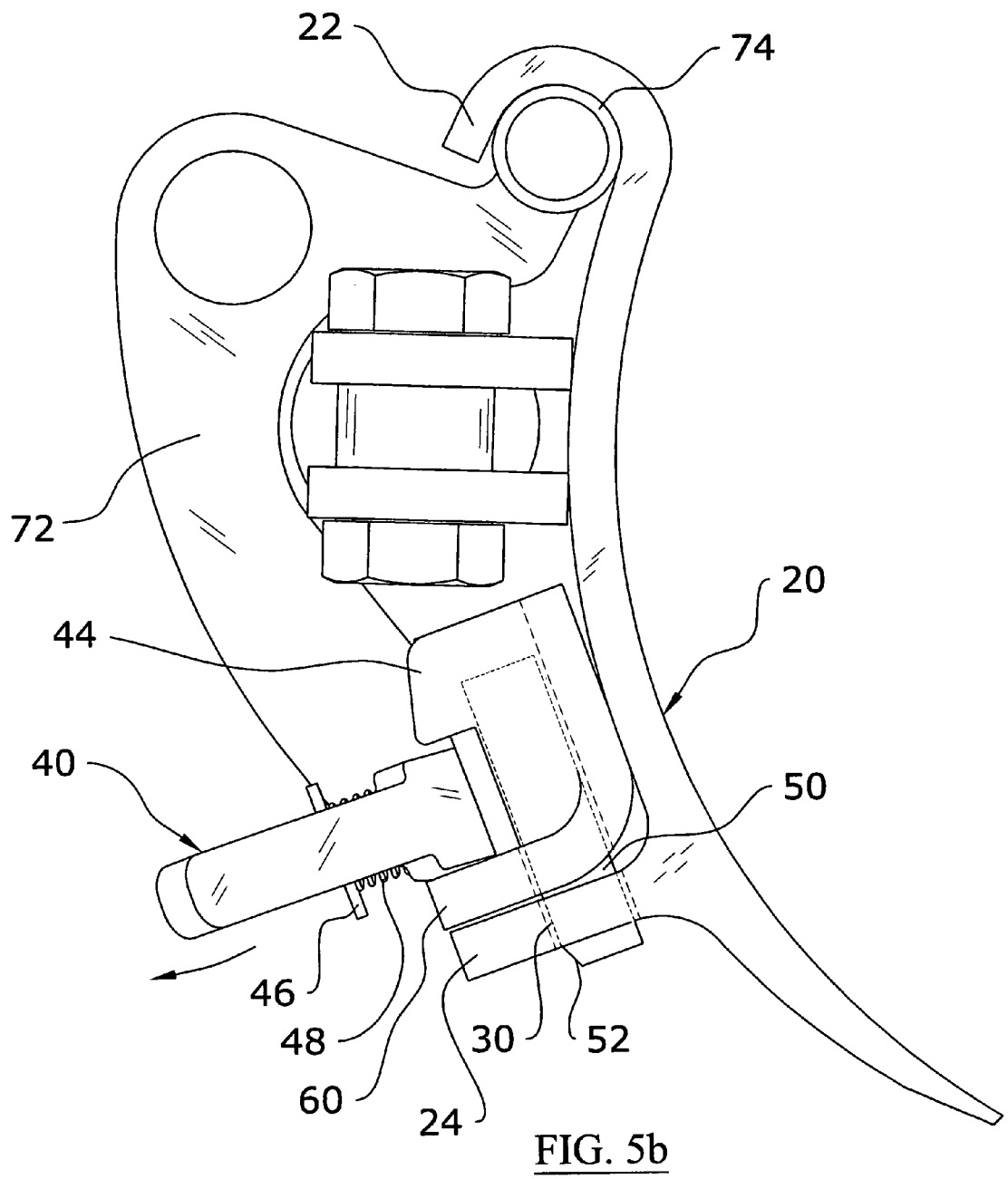
FIG. 5b is a side view of the latch structure with the lever member released.

The latch structure 40 preferably has a housing structure that slidably receives a locking pin 50 having a tapered portion 52 as shown in FIG. 3 of the drawings. The locking pin 50 extends through an opening within the support frame 60. The locking pin 50 preferably has a rectangular cross section for being slidably received within the slot 30 of the lower lip 24. The locking pin 50 has a width slightly smaller than a width of the slot 30 as best illustrated in FIG. 5b of the drawings.

The latch structure 40 further includes a lever member 42 attached to the locking pin 50 via a connecting member 46 for manipulating the locking pin 50. The connecting member 46 extends through an opening within the housing of the latch structure 40 and is attached to the locking pin 50.

A lever member 42 is movably attached upon the connecting member 46 as shown in FIG. 3 of the drawings. The lever member 42 has a handle portion and a leverage portion that selectively engages the support frame 60 for allowing the user to manipulate the position of the locking pin 50.

A bias member 48, preferably a compression spring, is attached between a broad head of the connecting member 46 and the leverage member for applying an inward force to the leverage member. The latch structure 40 includes a cutout forming an engaging portion 44 for securing the lever member 42 in a locked position. The bias member 48 retains the lever member 42 within the locked position within the engaging portion 44 as shown in FIGS. 2 and 5a of the drawings.

E. Implement Unit

The implement unit 20 may be comprised of any type of implement such as but not limited to a blade, plow, bucket, brush and the like. The implement unit 20 has a frame having an upper lip 22 and a lower lip 24 as shown in FIG.

1 of the drawings. The upper lip 22 removably and slidably engages the catch member 74.

As shown in FIGS. 5a through 5d of the drawings, the upper lip 22 has a shape similar to the shape of the catch member 74, such as circular. The upper lip 22 has an opening for receiving and releasing the catch member 74 such as a hook structure. The upper lip 22 preferably extends along a significant length of the implement unit 20 to provide adequate support and sliding room for the implement unit 20.

The lower lip 24 extends from a lower portion of the implement unit 20 as best shown in FIGS. 5a through 5d of the drawings. The lower lip 24 preferably extends a significant distance along the implement unit 20 as best illustrated in FIG. 1 of the drawings. The lower lip 24 is formed for being slidably positioned adjacent the lower edge of the support frame 60.

F. Slot

Figure 6:
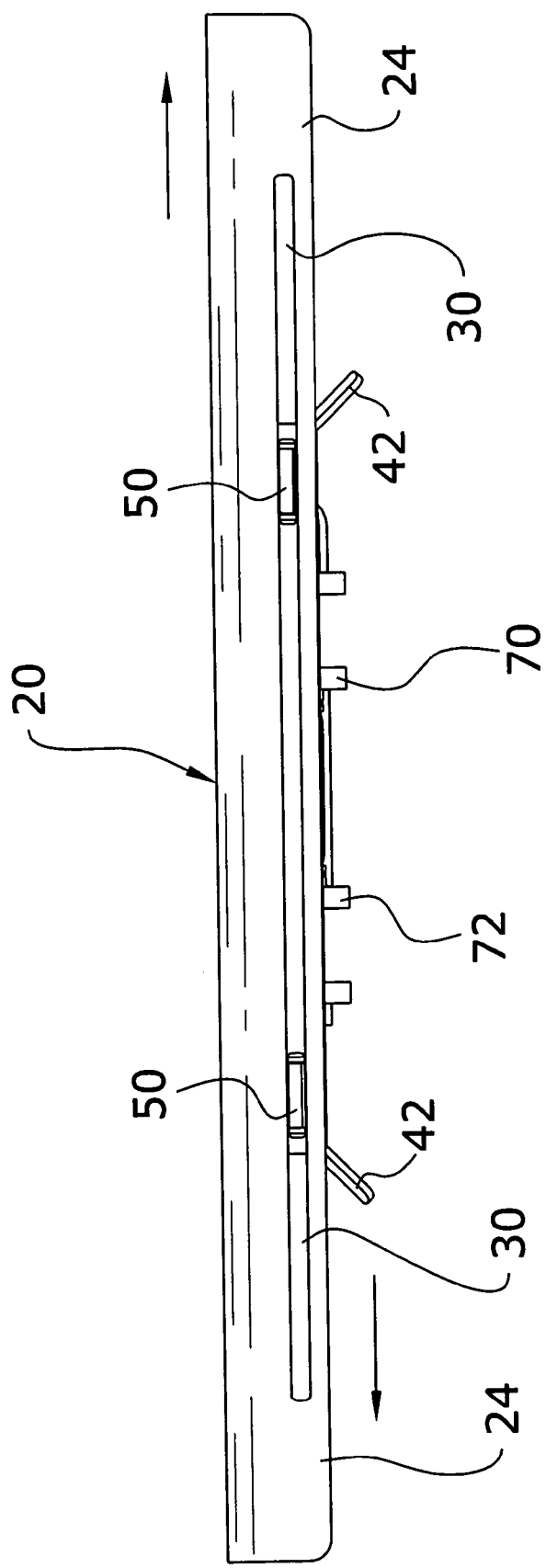
FIG. 6 is a bottom view of the present invention supporting an implement unit.

At least one slot 30 is positioned within the lower lip 24 as shown in FIGS. 1 and 6 of the drawings. The slot 30 extends longitudinally within the lower lip 24 and receives the locking pin 50 from the latch structure 40.

As shown in FIG. 6 of the drawings, the slot 30 preferably extends at least along fifty-percent of the length of the lower lip 24 to provide adequate sliding capabilities for the implement unit 20. The slot 30 is also preferably comprised of a straight and elongate structure as further shown in FIG. 6 of the drawings.

G. Actuator Unit

As shown in FIG. 1 of the drawings, an actuator unit 62 is attached between the support frame 60 and the implement unit 20 for applying a side-to-side force to the implement unit 20. The actuator unit 62 is preferably comprised of a hydraulic unit, however various other actuator structures may be utilized. The actuator unit 62 is connected to the implement unit 20 by a pin or other connection means that allows for easy disconnection and connection thereof.

H. Operation

With the implement unit 20 attached, the user is able to perform the normal four movements thereof: lift, pitch, roll and yaw. In addition to the normal four movements, the user is able to perform a fifth movement: sliding from side-to-side. The user simply extends/retracts the actuator unit 62 to move the implement unit 20 to the desired side as shown in FIGS. 7a and 7b of the drawings. The locking pin 50 retains the implement unit 20 attached to the support frame 60 while sliding freely within the slot 30.

Figure 5C:
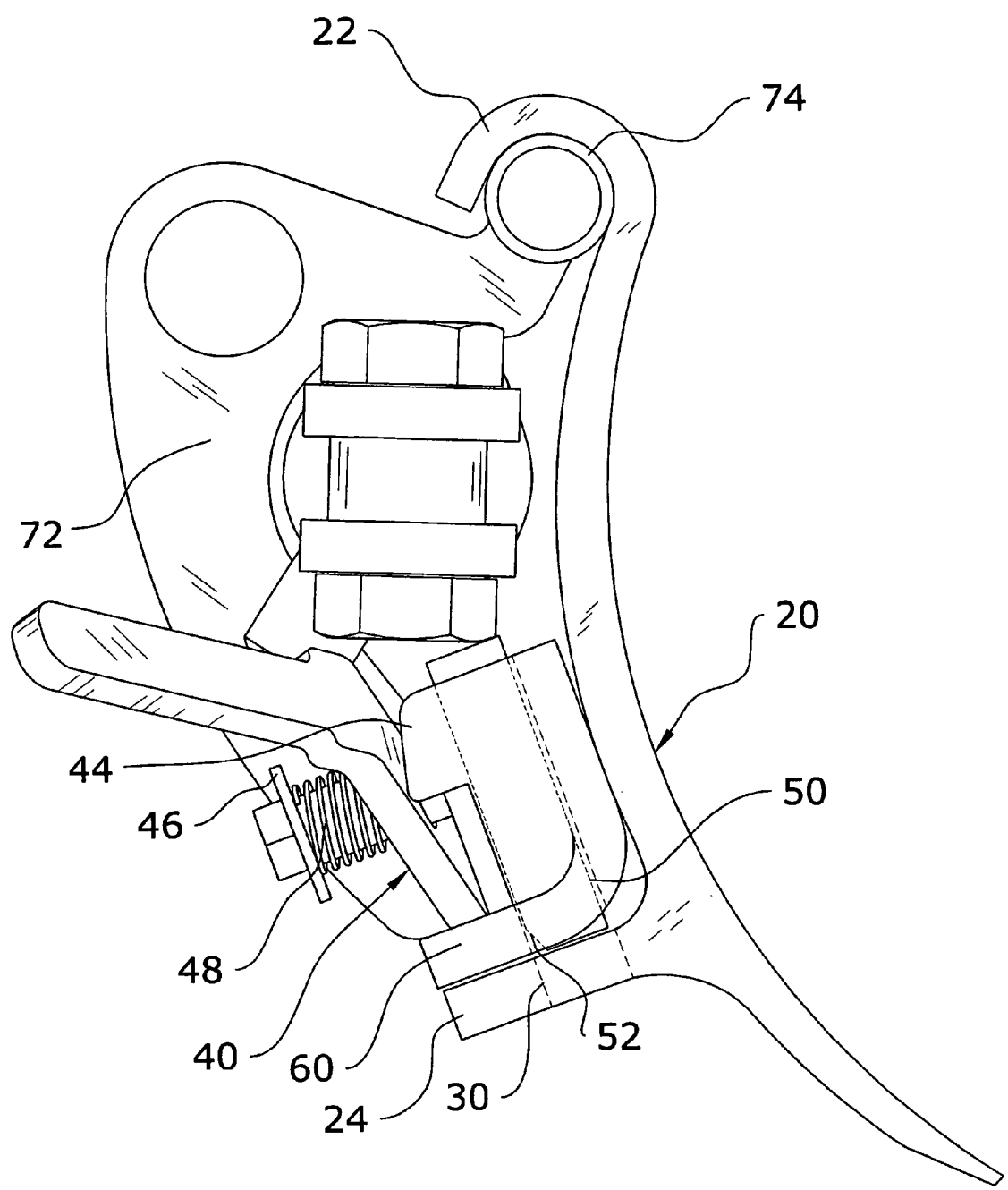
FIG. 5c is a side view of the latch structure with the lever member rotated thereby retracting the locking pin from within the slot of the implement unit.
Figure 5D:
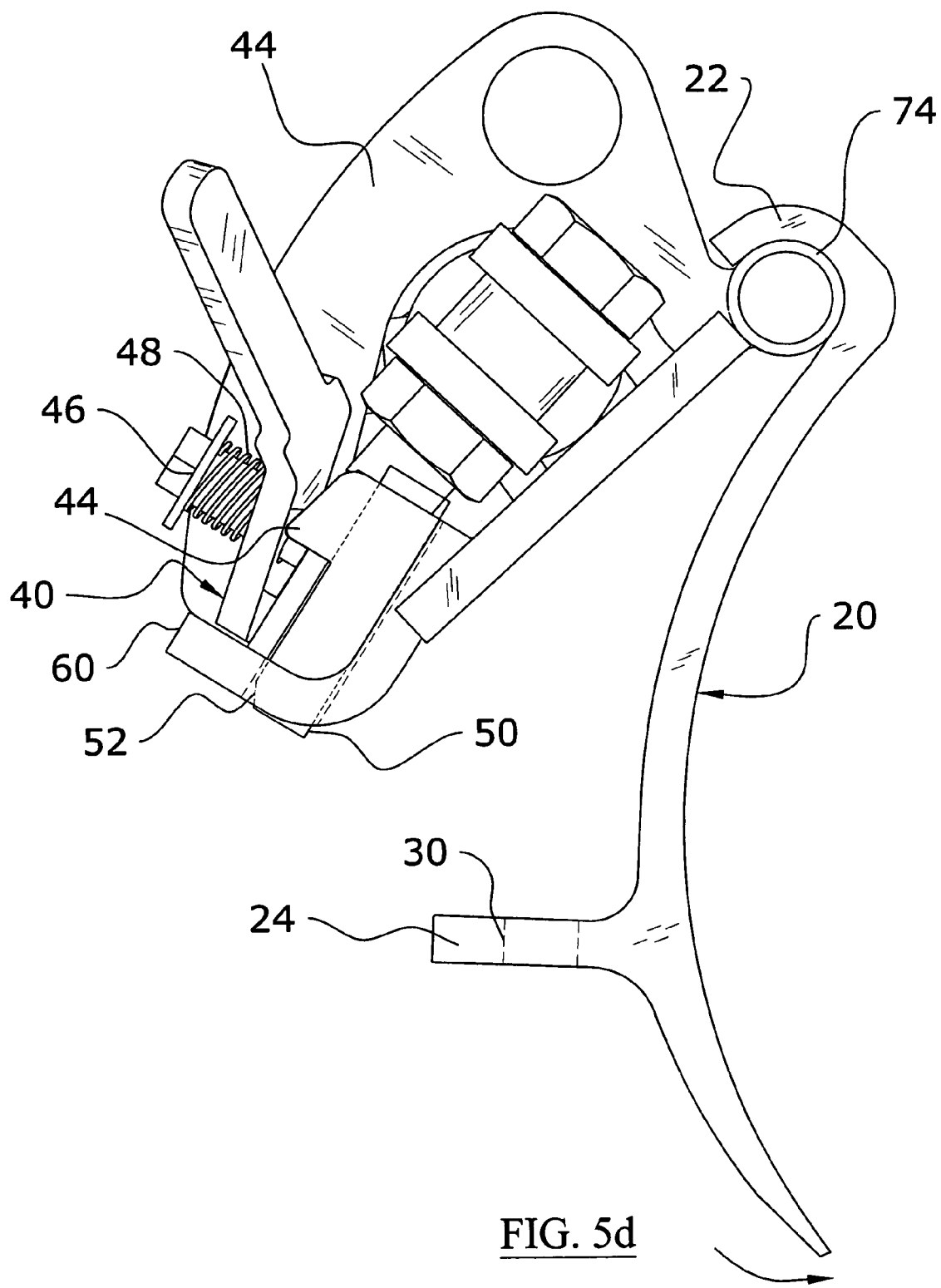
FIG. 5d is a side view of the lower portion of the implement unit being rotated outwardly away from the latch structure for removing the implement unit.

To remove an implement unit 20 from the support frame 60, the user first pulls upon the lever member 42 to release the same from the engaging portion 44 as shown in FIGS. 4b and 5b of the drawings. The user then rotates the lever member 42 upwardly thereby causing the locking pin 50 to retract from the slot 30 as shown in FIGS. 4c and 5c of the drawings. After the locking pin 50 is fully removed from the slot 30 within the lower lip 24, the user may then pivot the lower portion of the implement unit 20 away from the support frame 60 as shown in FIG. 5d of the drawings. After the lower lip 24 is a sufficient distance from the support frame 60, the user may then either lower the support frame 60 or raise the implement unit 20 to disengage the upper lip 22 from the catch member 74. To attach a new implement unit 20, the above procedure is simply reversed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sliding quick attach system, comprising:
    a support frame;
    at least one catch member attached to said support frame;
    at least one latch structure attached to said support frame;
    an implement unit having an upper lip and a lower lip, wherein said upper lip removably and slidably engages said catch member; and
    at least one slot within said lower lip, wherein said slot extends longitudinally within said lower lip and wherein said slot slidably and substantially transversely receives a locking pin from said latch structure for allowing said implement unit to move side-to-side with respect to said support frame.

2. The sliding quick attach system of claim 1, wherein said slot extends at least along fifty-percent of the length of said lower lip.

3. The sliding quick attach system of claim 1, wherein said upper lip is comprised of a hook structure.

4. The sliding quick attach system of claim 1, including a first brace and a second brace extending between said support frame and said catch member.

5. The sliding quick attach system of claim 1, wherein said locking pin includes a tapered portion.

6. The sliding quick attach system of claim 1, wherein said locking pin has a rectangular cross section.

7. The sliding quick attach system of claim 6, wherein said locking pin has a width slightly smaller than a width of said slot.

8. The sliding quick attach system of claim 1, wherein said catch member is comprised of a rod structure.

9. The sliding quick attach system of claim 1, wherein said latch structure includes a lever member attached to said locking pin for manipulating said locking pin.

10. The sliding quick attach system of claim 9, wherein said latch structure includes an engaging portion for securing said lever member in a locked position and a bias member in contact with said lever member for retaining said lever member within said engaging portion.

11. A sliding quick attach system, comprising:
    a support frame;
    at least one catch member attached to said support frame;
    at least one latch structure attached to said support frame;
    an implement unit having an upper lip and a lower lip, wherein said upper lip removably and slidably engages said catch member;
    at least one slot within said lower lip, wherein said slot extends longitudinally within said lower lip and wherein said slot slidably and substantially transversely receives a locking pin from said latch structure for allowing said implement unit to move side-to-side with respect to said support frame; and an actuator unit attached between said support frame and said implement unit for applying a side-to-side force to said implement unit.

12. The sliding quick attach system of claim 11, wherein said slot extends at least along fifty-percent of the length of said lower lip.

13. The sliding quick attach system of claim 11, wherein said upper lip is comprised of a hook structure.

14. The sliding quick attach system of claim 11, including a first brace and a second brace extending between said support frame and said catch member.

15. The sliding quick attach system of claim 11, wherein said locking pin includes a tapered portion.

16. The sliding quick attach system of claim 11, wherein said locking pin has a rectangular cross section.

17. The sliding quick attach system of claim 16, wherein said locking pin has a width slightly smaller than a width of said slot.

18. The sliding quick attach system of claim 11, wherein said catch member is comprised of a rod structure.

19. The sliding quick attach system of claim 11, wherein said latch structure includes a lever member attached to said locking pin for manipulating said locking pin.

20. The sliding quick attach system of claim 19, wherein said latch structure includes an engaging portion for securing said lever member in a locked position and a bias member in contact with said lever member for retaining said lever member within said engaging portion.

* * * * *